United States Patent
Le Floch (10) Patent No.: US 8,522,036 B2
(45) Date of Patent: Aug. 27, 2013

(54) METHOD FOR PROVIDING ACCESS CONTROL TO MEDIA SERVICES

(75) Inventor: Dominique Le Floch, Montrouge (FR)

(73) Assignee: Nagravision S.A., Cheseaux-sur-Lausanne (CH)

( * ) Notice: Subject to any disclaimer, the term of this patent is extended or adjusted under 35 U.S.C. 154(b) by 550 days.

(21) Appl. No.: 12/786,181

(22) Filed: May 24, 2010

(65) Prior Publication Data

US 2010/0299528 A1 Nov. 25, 2010

(30) Foreign Application Priority Data

May 25, 2009 (EP) .................................... 09161027

(51) Int. Cl.
*H04L 9/32* (2006.01)
*H04L 29/06* (2006.01)
*H04N 7/167* (2011.01)

(52) U.S. Cl.
USPC ............................ 713/179; 380/200; 380/211

(58) Field of Classification Search
USPC .................... 380/211, 200; 713/179
See application file for complete search history.

(56) References Cited

U.S. PATENT DOCUMENTS

| | | | |
|---|---|---|---|
| 7,970,138 B2 * | 6/2011 | Cocchi et al. | 380/200 |
| 2005/0238170 A1 | 10/2005 | Ksontini et al. | |
| 2007/0223695 A1 | 9/2007 | Beun et al. | |
| 2007/0286422 A1 | 12/2007 | Cocchi et al. | |
| 2010/0266123 A1 * | 10/2010 | Tao | 380/211 |

FOREIGN PATENT DOCUMENTS

FR 2 871 017 12/2005

OTHER PUBLICATIONS

European Search Report issued in EP 09 16 1027, mailed Sep. 23, 2009.
Louis Claude Guillou et al., "Encipherment and Conditional Access", SMPTE Journal, vol. 103, No. 6, pp. 398-406 (Jun. 1994).
Hegel Bar-El et al., "The Sorcerer's Apprentice Guide to Fault Attacks", http://web.archive.org/web/20041016071838/eprint.iacr.org/2004/100>, XP002329915, retrieved May 27, 2005.

* cited by examiner

*Primary Examiner* — Shin-Hon Chen
(74) *Attorney, Agent, or Firm* — DLA Piper LLP US (57) ABSTRACT

The present invention proposes a solution to prevent a program flow in a processing unit from being modified with respect to an intended program flow, thereby ensuring that important steps such as verifying or authenticating are not bypassed. The invention is particularly aimed at security modules within receiver/decoders in a pay-TV system and involves performing a set of predetermined operations during the processing of entitlement management messages and/or entitlement control messages, said operations being redundant with respect to the normal processing of said messages while leading to the calculation of keys which can then be used to verify that the intended program flow has been respected.

10 Claims, 4 Drawing Sheets

METHOD FOR PROVIDING ACCESS CONTROL TO MEDIA SERVICES

INTRODUCTION

The present invention relates to the domain of conditional access (CA) and more precisely to a system and method for securely providing CA entitlement and control information to subscribers to media services.

STATE OF THE ART

State of the art broadcasting of digital media services from a content provider (TX) to a plurality of viewers usually involves a process of encrypting the media services, otherwise known as content (CT), using control words (CW) and broadcasting the encrypted content (CT') in a digital data stream to the plurality of viewers. To allow the viewers to decrypt the encrypted content (CT'), entitlement control message (ECM) are included in the broadcast digital data stream along with encrypted content. These entitlement control messages (ECM) comprise the control words (CW) encrypted under a transmission key. This is the normal situation in a so-called pay-TV environment wherein the viewers are in fact subscribers in that they pay for the services provided by the content provider or providers. The content provider(s) may provide a variety of different services to which each subscriber may subscribe by paying the necessary fees.

Each subscriber is in possession of a receiver/decoder (RX) and an associated security module (SM). The receiver/decoder (RX) is equipped to be able to process the broadcast digital data stream to isolate various components such as content pertaining to a plurality of channels and control messages such as ECMs for example. The security module is equipped to be able to decrypt the ECMs received in a digital data stream, under certain circumstances, thus allowing for the content to be decrypted and viewed in clear. In fact the security module stores secret keys which are supplied by the content provider(s) and which will allow for the ECMs to be decrypted. If the security module is in possession of whatever rights a content provider has deemed necessary in order for the viewer to be able to view his content, then the security module will be authorised to allow the ECMs to be decrypted. By paying the necessary fees for different services for example, the subscribers can earn the rights to be able to decrypt those services. Such rights are verified in the security module before allowing for the content to be decrypted. The rights are attributed to each receiver/decoder by the content provider(s) by way of entitlement management messages (EMM). These EMMs are messages which are included in the broadcast digital data stream and are targeted at specific receiver/decoders or groups of receiver/decoders which the content provider deems as qualifying for the rights affected by such messages. Upon reception of an EMM, the targeted security module can load the right(s) contained therein into an area designated to hold such rights or otherwise update an expired right already in its possession. When the ECM is received, the right(s) indicated by the ECM can be checked against the existing rights in the security module, as loaded or updated via the EMM. In the case that the rights are present, the ECM may be decrypted thus revealing the control word (CW) and allowing for the content to be decrypted.

Security modules, as mentioned above, can be implemented in a variety of manners such as on a microprocessor card, on a smartcard or any electronic module in the form of a badge or key. These modules are generally portable and detachable from the receiver and are designed to be tamperproof. The most commonly used form has electrical contacts but contactless versions of type ISO 14443 also exist. Another implementation of the security module exists where it is directly soldered inside the receiver, a variation of this being a circuit on a socket or connector such as a SIM module. Yet another implementation is to have the security module integrated on a chip which has another function e.g. on the descrambling module or on the microprocessor module of the decoder. The security module can also be implemented in software.

The process of transmitting encrypted data and the use of ECMs and EMMs is covered in a standards document UTE C90-007 "Access Control System for Digital Broadcast Systems". We are reminded that ECMs generally comprise information such as Service Operator Identifier (SOID), current date, at least one cryptogram of a control word (in fact they often have two control words, an "odd" and an "even" control word), initialisation data for a key generation routine, a cryptographic checksum or hash value and various parameters for controlling access entitlement, such as access criteria, programme number, cost (PPV/time unit or PPV/pulse), number of authorised control word computations etc. Similarly, EMMs generally comprise an individual address or a group address, a description of a user's entitlements or contract information pertaining to a receiver, dates, credit values, update/add/delete info for a right, information on how and when a right is to be stored, a checksum etc. The ECMs and EMMs are generally digitally signed in order to allow for them to be authenticated. The processing of ECMs and EMMs, following reception, thus entails such procedures as verifying their authenticity thanks to the checksums or digital signatures contained therein, checking dates, checking the validity of rights etc. Such processing of ECMs and EMMs is indeed well-known in the state of the art.

Conditional access systems are not just restricted to the domain of pay-TV services. Indeed they exist in various domains such as physical access control, banking, pay-TV, electronic wallets etc. As can be clearly seen, the bypassing of the security afforded by conditional access systems could offer an unauthorised person an opportunity to make lucrative gains or otherwise deprive a rightful service provider of access to such gains and therefore such systems attract a significant level of piracy. Indeed, if the secret keys contained within a security module could be made known, they could be used to fabricate counterfeit receiver/decoders allowing their users to have free access to the services thereby robbing the service providers of the revenue to which they would be entitled. Pirates use various techniques involving direct observation and manipulation of electronic components within or around the security module to discover key material therein. The discovery of secret keys is not the only type of attack which can be made on conditional access systems, indeed a particular type of attack which is non-invasive and therefore dangerous in the sense that it may go undetected for a significant period and is usually easily reproducible, is what is known as a glitch attack.

Glitch attacks have the effect of causing a mal-function in one or more of the flip-flops which are contained in a processing unit. Such malfunctions, depending on where they occur, can cause the execution of a program running in the processing unit to bypass one or more steps or otherwise interfere with the expected functioning of the processing unit. Indeed, the processing unit may be made to skip critical routines which perform important checks such as authenticating and validating. Glitch attacks may also have the effect of corrupting data values as they transfer between registers within the processing unit. Fairly reliable techniques for causing such malfunctions can involve inducing clock signal transients, power supply transients or external electrical field transients, i.e. glitches, hence the name adopted for this type of attack.

Systems and methods have been described in the state of the art to make security modules temper-resistant. Such techniques involve randomising clock signals, randomised multi-threading or low-frequency sensing as described in "Design Principles for Tamper-Resistant Smartcard Processors, Kömmerling and Kuhn. Randomising clock signals involves adding hardware to insert random time-delays between possible observable reactions and critical operations that may be subject to an attack. Randomised multi-threading introduces a multithread processor architecture whereby multiple processing threads are created by having multiple copies of all registers. The processing is scheduled between the multiple threads thus making the progress of the processing hard to follow. Low-frequency sensing requires, the addition of extra analogue hardware, which can be costly in terms of real-estate. Other techniques involve glitch detection as in United States Patent Application 2003/0226082. These techniques involve the addition of analogue hardware and therefore have a significant impact on real-estate in the case that they are realised as integrated circuits.

The document US 2007/286422 describes the common Pay-TV access control in two steps. The first step is to receive a first message comprising a right that is stored into the target device. The second step is to receive a second message comprising the key (CW) to access the video content and access conditions. The second message is first decrypted and the access conditions are checked against the rights stored in the target device. If the rights are present, the control word is released and the video content can be decrypted.

The present invention therefore proposes a solution to prevent a program flow in a processing unit from being modified with respect to an intended program flow, thereby ensuring that important steps such as verifying or authenticating are not bypassed. The invention is particularly aimed at security modules within receiver/decoders in a pay-TV system.

SUMMARY OF THE INVENTION

The present invention proposes a secure solution in the domain of conditional access control to media services by providing a method for allowing a receiving device (RX) comprising a security module (SM) to access media services (CT) encrypted under at least a control word (CW), said access being subject to at least the presence of a right (Ri) in said security module (SM), said right (Ri) being recorded in the security module (SM) according to the following steps:
  receiving an entitlement management message (EMM) comprising at least said right (Ri),
  processing (PROCEMM) the entitlement management message (EMM) at least to check its validity,
  during the processing (PROCEMM) of said entitlement management message (EMM), building a signature value (SVi) through a plurality of predetermined operations (OPEMM) at intervals within said processing step,
  deriving a digest (KRi) from all or part of said signature value (SVi),
  if said entitlement management message (EMM) is valid, recording the right (Ri) into a rights database (DB) together with the digest (KRi),
the control word (CW) being determined according to the following steps:
  receiving an entitlement control message (ECM) including an encrypted control word (CW') and comprising at least an access condition ($AC_{Ri}$) referring to said right (Ri),
  processing said entitlement control message (ECM) at least to verify whether the right (Ri) referred to by said access condition ($AC_{Ri}$) is present in the rights database (DB),
  if said right (Ri) is present in the database (DB), retrieving the corresponding digest (KRi),
  decrypting the encrypted control word (CW') using said digest (KRi) or a global EMM key (GEMMK) obtained by said digest (KRi).

The invention thus provides for a means to ensure that the processing of EMM and ECM messages is carried out according to a predetermined programme flow by building signature values during said processing and by using the signature values thus obtained, either directly or indirectly, to decrypt encrypted control words. A successful decryption means that the keys were obtained correctly and so guarantees that the predetermined programme flow was adhered to. The invention also applies to the case when different programme flows are necessary to process different types or categories of messages thereby leading to different signature values to decrypt the same control word.

BRIEF DESCRIPTION OF THE DRAWINGS

The present invention will best be understood by referring to the following detailed description of preferred embodiments when read in conjunction with the accompanying drawings, wherein.

DETAILED DESCRIPTION

The present invention offers a solution at least to the problem of glitch attacks, as described in the state of the art, whereby a processor is made to skip or otherwise malfunction during the processing of sensitive information. Furthermore, the solution offers the advantage that any sanction resulting from the detection of such malfunctioning is deferred in such as way as to withhold information which may otherwise have been used by a potential hacker to refine future attacks.

In a pay-TV system, media services provided by a content provider are encrypted under control words (CW) before being broadcast to subscribing viewers who are in possession of a receiving device (RX) and an appropriate associated security module (SM). The control words (CW) are encrypted and broadcast along with the encrypted media services in the form of entitlement control messages (ECM). The ECMs further comprise at least one access condition or criterion ($AC_{Ri}$) which has to be met in order for a security module (SM) to be authorised to decrypt the control word (CW).

As mentioned, receiving devices are associated with a security module (SM) which, for all intents and purposes is tamper proof. The security module (SM) holds one or more decryption keys to decrypt encrypted control words (CW) contained within the ECMs on condition that the receiving device, or more exactly its associated security module, complies with the access condition ($AC_{Ri}$) referred to in the ECM. In other words, the security module (SM) has to be in possession of the necessary rights (Ri) to consume the media services since the access condition ($AC_{Ri}$) usually refers to the possession of such rights (Ri). The necessary rights (Ri) are usually purchased by the viewer and recorded in the security module (SM) within the receiving device (RX). The rights (Ri) are recorded when an appropriately addressed electronic entitlement management message (EMM) referring to the particular right (Ri) and directed to the particular security module (SM) is received by that particular receiving device (RX). The EMM is usually in encrypted format and comprise verification data such as hash value on the content or a signature of the right using the public/private key mechanism. This message is processed (PROCEMM) i.e. decrypted and verified using the verification data for authenticity, by the security module (SM) for which it is apparently intended, and then the right is stored.

According to a preferred embodiment of the present invention, in order to prevent the possibility of an attack whereby during the processing (PROCEMM) of the EMM in a security module (SM) the processor is made to skip or otherwise bypass certain parts of the processing, notably a part where important verifications are made, a specific set of operations (OPEMM), known to the content provider, are carried out during the EMM processing (PROCEMM). These operations (OPEMM) are redundant steps with respect to the normal processing of the EMM and do not affect the normal outcome of the processing. However by carrying out the aforementioned operations (OPEMM) during the processing of the EMM (PROCEMM) a specific result is achieved in that a signature value (SVi) is built. This signature value (SVi) can be used to locally derive a digest (KRi) for example by using a mapping or a logical or arithmetical function such as a hash or other one way function. The specific operations (OPEMM) are embedded at intervals within the normal processing of the EMM in such a way that successful completion of all of the operations (OPEMM) substantially guarantees that the normal processing of the EMM has been correctly completed. If the EMM has been properly decrypted and authenticated, then the right (Ri) associated with the EMM and the locally built signature value (SVi) are recorded in a rights database (DB) in the security module (SM). The content provider (TX), having prior knowledge of the specific set of operations (OPEMM) and the function used to derive a digest, can generate his own copy of the digest (KRi), this version being known as a reference digest (RKRi). The digest (KRi), built locally by genuine security modules (SM) whose processing (PROCEMM) has not been tampered with, will be the same as the reference digest (RKRi). The reference digest (RKRi) is used to encrypt the control word (CW'), thus making sure that a security module (SM) which is able to derive the correct digest (KRi) locally, and therefore is able to decrypt the control word, has indeed completed the intended processing (PROCEMM) of the EMM.

In the known method, the right is transported in a EMM, said EMM is decrypted, verified and the corresponding right is stored into the security module. Then, when an ECM is presented to the security module, the access conditions contained into the ECM are compared with the rights previously stored and the control word is released if the right is present.

In the present invention, not only the right is necessary to release the control word, but a digest that is not contained in the EMM or the ECM. The digest is a dynamic data created during the processing of the EMM. If the EMM is correctly processed, the digest will be the expected data. Otherwise, the digest will by wrong but at the time of the reception of the EMM, no consequence is noticeable since no comparison operation is carried out. It is only when a ECM is processed that the digest will be used to decrypt the control word. Even at that time, the final result is considered as valid by the security module and given to the descrambler. In case that the processing of the EMM was corrupted, the final control word will by wrong and the video content descrambled completely altered.

Figure 1:
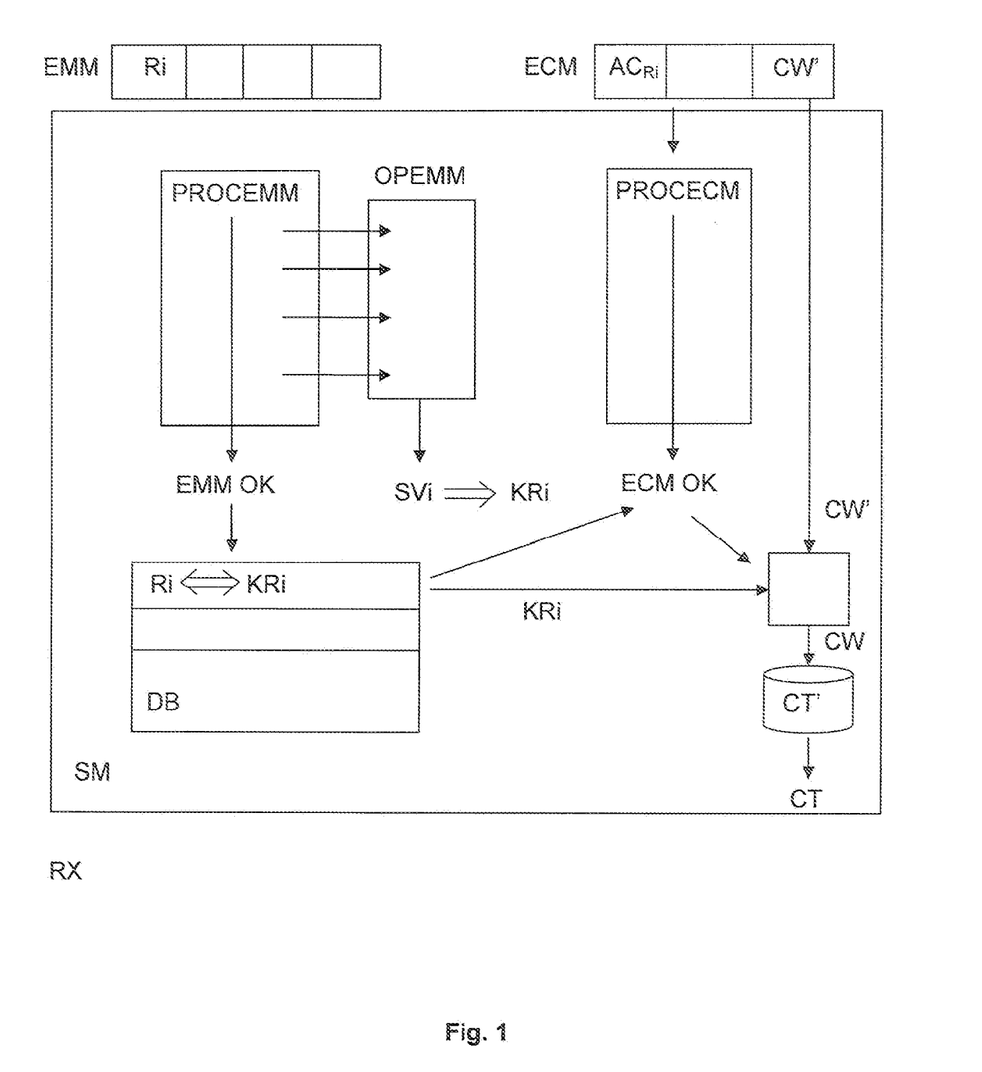
FIG. 1 shows a simplified block diagram of a one embodiment of the present invention.

As shown in FIG. 1, a message EMM comprising a right (Ri) is received by a receiving device and transferred to its associated security module (SM) for processing (PROCEMM). A specific set of operations (OPEMM) are carried out during the processing of the EMM and the operations serve to build a signature value (SVi). The signature value is used to derive a digest (KRi) as described above. If the EMM is deemed valid, then the right (Ri) and the digest (KRi) are stored in the rights database (DB). When an ECM, comprising at least an access condition ($AC_{Ri}$) and an encrypted control word (CW'), is received by the receiving device (RX) it is transferred to the security module (SM) for processing (PROCECM). If the access conditions ($AC_{Ri}$) match aright in the rights database (DB), then the control word is decrypted using the digest (KRi) related to said right. If the EMM processing had not been tampered with, then the decryption yields a valid control word (CW) and the encrypted content (CT') from the content provider (TX) can be correctly decrypted (CT).

It is worth noting that during the lifetime of a security module running such software as described above, it may become necessary to update the software. This is usually done by way of a software patch. The patched software would of course need to remain compatibility with the above described method in that the patched software would yield the same signature value or would derive the same digest or the content provider would take the new software and the resulting new signature value into consideration when encrypting the control word.

A practice which is commonly employed by content providers is to bundle multiple services into one package. A subscriber who pays for a complete package of services therefore needs to have access to all of the bundled services, whereas each of the services in the bundle may have different access rights. Similarly, several different types or categories of rights (Ri) can exist. A receiving device (RX) may receive therefore several rights each pertaining to a different category of rights via one or more appropriately addressed EMMs. For example, there may be a plurality of possible rights pertaining to a category "Pay-Per-View", such as "credit value" or "update an expiry date" and a plurality of possible rights pertaining to a category "Subscription", such as "add a subscription" or "update an existing subscription" etc. The processing of the received EMMs (PROCEMM) therefore varies depending on the right or type of right (Ri) contained therein. Indeed the number of variations in processing can be quite large and the number of jumps, branches and conditions encountered during the processing may be quite complex. The processing of a right can therefore lead to a different signature value (SVi), and consequently different digests (KRi), depending on which type of right is being processed.

This leads to a limitation in the preferred embodiment described above since it becomes a requirement for different digests to be able to decrypt the same control word. One way around this problem would be for the content provider to arrange for each of the specific sets of operations (OPEMM) encountered via all the different possible branches and jumps during the EMM processing (PROCEMM) to yield the same signature value (SVi). Rather then trying to apply this complex and tedious solution, another embodiment of the present invention, shown in FIG. 2, proposes the acknowledgement that different signature values (SVi) may result, depending on which right or category of right is being processed. We therefore have a plurality of possible different digests (KRi) being produced as a result of the processing of the EMM according to whichever flow (CAT1, CAT2) the processing follows. For example, the processing of all rights of type or category "Pay-Per-View" could yield one digest (KRi) while the processing of all rights of type "Subscription" leads to a different digest (KRi).

Figure 2:
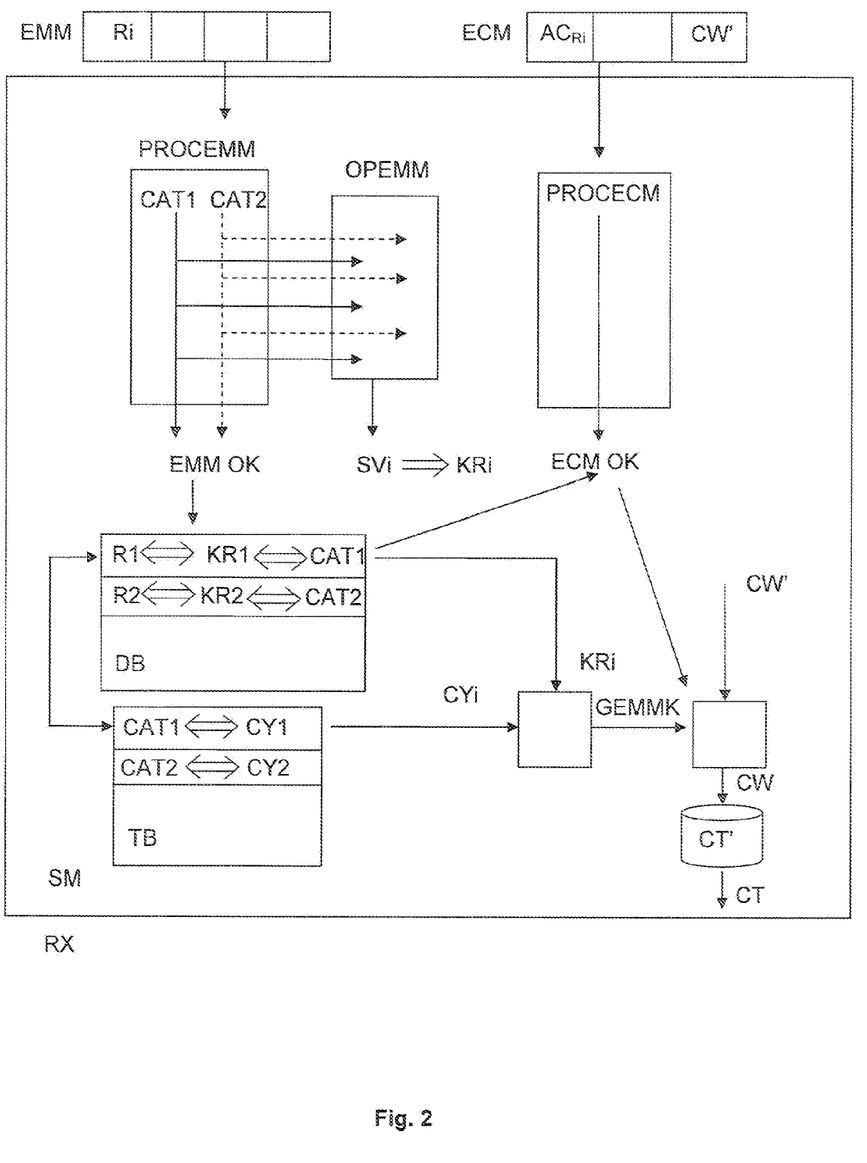
FIG. 2 shows a simplified block diagram of another embodiment of the present invention.

In this embodiment, the control word is encrypted under a global EMM key (GEMMK). Furthermore, a table (TB) exists in the security module (SM). The table comprises a plurality of cryptograms (CYi) and a corresponding plurality of categories (CAT1, CAT2). A cryptogram (CYi) corresponding to a particular category represents the global EMM key (GEMMK) encrypted under a reference digest (RKRi) pertaining to that category. For example, rights R1 and R2 belong to category C1, and the reference digest of category 1 is RKR1, so the cryptogram CY1 corresponding to CAT1 will be the global EMM key (GEMMK) encrypted by reference digest (RKR1). All of these digests and cryptograms of course are known by the content provider. The table (TB) is preloaded in the security module (SM). For example, the table can be built into the security module (SM) at the time of manufacture or it can be delivered by the content provider in the form of an update package for the security module, either by internet or by postal service or some other communications channel. Instead of the whole table (TB) being delivered from the content provider, the security module (SM) could comprise a means to calculate or otherwise derive the table (TB).

When the receiving device (RX) receives an EMM comprising at least a right (Ri) of a certain category (CAT1, CAT2), the associated security module (SM) processes the EMM (PROCEMM) thereby locally deriving a digest (KRi) pertaining to said category (CAT1, CAT2). The derived digest (KRi) and its associated category (CAT1, CAT2) are stored in the rights database (DB) along with the corresponding right (Ri). If the processing of the EMM has not been tampered with, then the digest (KRi) thus determined will be equal to their corresponding reference digests (RKRi) as generated by the content provider (TX). When the receiving device (RX) receives an ECM comprising access conditions ($AC_{Ri}$) referring to said right (Ri), the associated security module (SM) determines to which category the right belongs and retrieves the cryptogram (CYi) corresponding to said category thanks to the table (TB). The security module then retrieves the digest (KRi) corresponding to the category (CAT1, CAT2) of said right (Ri) from the rights database (DB) and decrypts the cryptogram (CYi) using the digest (KRi) thus obtaining the global EMM key (GEMMK). The control word (CW) can then be decrypted from the encrypted control word (CW') using the global EMM key (GEMMK).

It should be noted that the above embodiment may be combined with the embodiment described in FIG. 1 in that the control word could be encrypted directly by the signature value (SVi) or by the digest (KRi), in which case the signature value (SVi) or the digest (KRi) would be used to decrypt the encrypted control word (CW').

Figure 3:
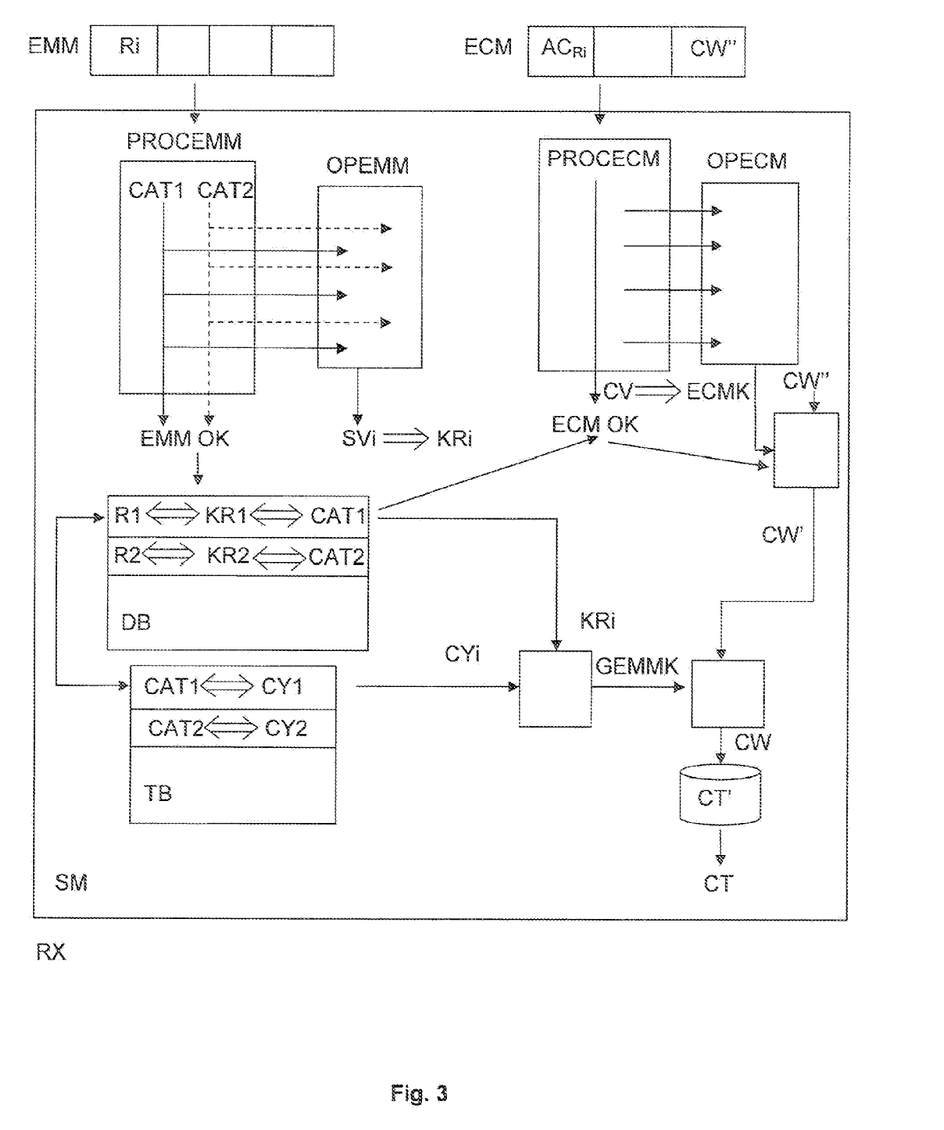
FIG. 3 shows a simplified block diagram of yet another embodiment of the present invention.

In yet another embodiment of the present invention, the control word (CW) is double encrypted (CW"). It is first encrypted by the global EMM key (GEMMK) and then by a reference ECM key (RECMK). In this embodiment, shown in FIG. 3, as well as the specific set of operations (OPEMM) being carried out during the processing related to the EMM (PROCEMM) as described in the previous embodiments, a further set of specific operations (OPECM), known to the content provider, is also carried out in the security module (SM) when an ECM is received. These operations (OPECM) are redundant steps with respect to the normal processing of the ECM (PROCECM) and do not affect the normal outcome of the processing. However by carrying out the aforementioned operations (OPECM) during the processing of the ECM (PROCECM) a specific result is achieved in that a check value (CV) is built. This check value (CV) can be used to locally derive an ECM key (ECMK) for example by using a mapping or a logical or arithmetical function such as a hash or other one way function. The specific operations (OPECM) are embedded at intervals within the normal processing of the ECM (PROCECM) in such a way that successful completion of all of the operations (OPECM) substantially guarantees that the normal processing of the ECM has been correctly completed. If the ECM processing has not been tampered with, then the locally derived ECM key (ECMK) is equal to the reference ECM key (RECMK). Using the locally derived ECM key (ECMK), the double encrypted control word (CW") is decrypted to give an encrypted control word (CW'). The encrypted control word (CW') is then decrypted using the locally derived global EMM key (GEMMK) to give the control word (CW) thereby allowing the encrypted content (CT') to be decrypted by the security module (SM).

Similarly, it is to be noted that the above embodiment may be combined with the embodiment described in FIG. 1 in that the control word could be encrypted directly by the signature value (SVi) or by the digest (KRi), in which case the signature value (SVi) or the digest (KRi) would be used to decrypt the encrypted control word (CW').

Figure 4:
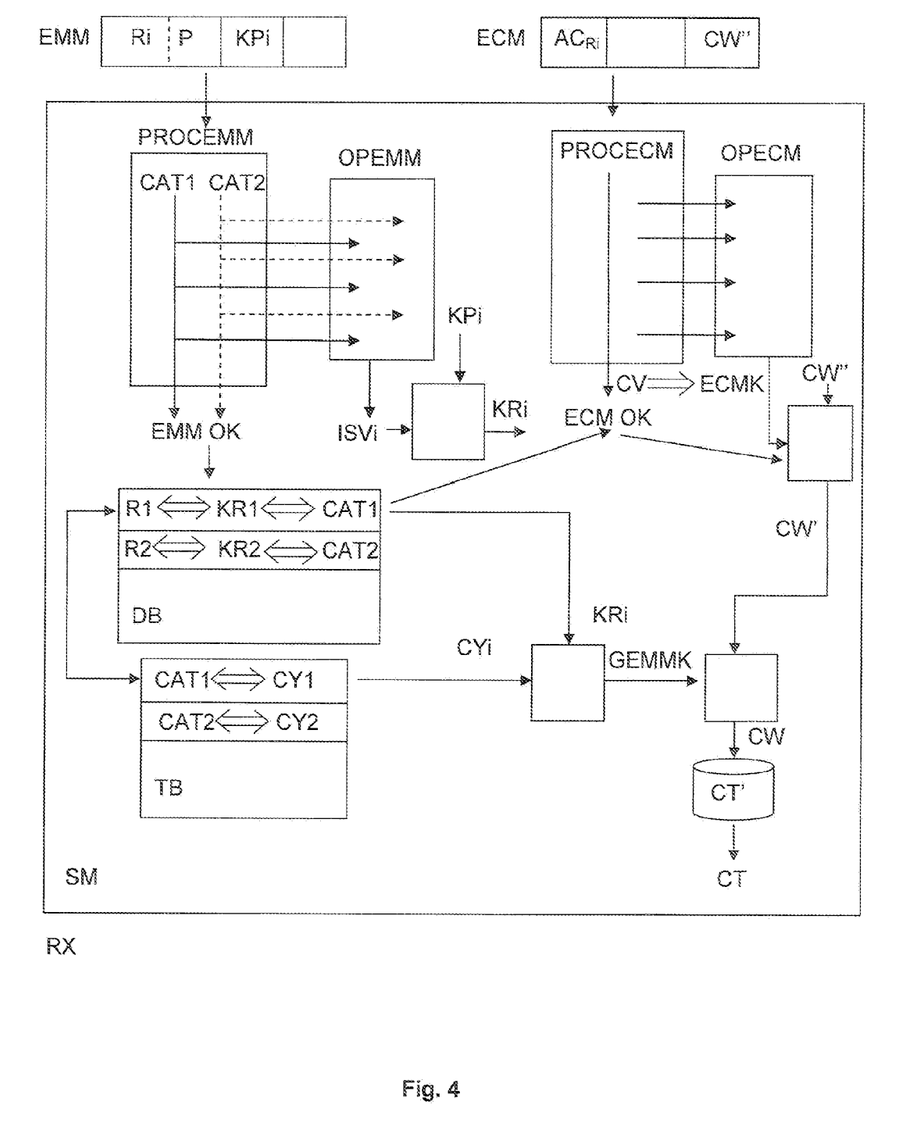
FIG. 4 shows a simplified block diagram of an embodiment of the present invention wherein a number of different categories of rights is illustrated.

In a further embodiment of the present invention, FIG. 4, the control word is double encrypted as above, but the EMM further comprises the digest (KRi) encrypted by an individual signature value (ISVi) and yet further comprises a parameter (P) to be used as initialisation data in a calculation allowing to derive a local copy of the individual signature value (ISVi) during the execution of the set of operations (OPEMM). This way each EMM addressed to a security module allows for that security module to calculate its individual signature value (ISVi) in order to decrypt the encrypted digest contained in the EMM. The parameter (P) may be a separate field within the EMM or it may form part of existing data within the EMM or it may be derived or otherwise calculated from existing data within the EMM. For example, the parameter (P) may be the current date or a derivative of all or part of the right (Ri) contained in the EMM. The EMM therefore comprises the right (Ri), the parameter (P) (either directly or indirectly) and the digest (KRi) encrypted by an individual signature (ISVi). We refer to the digest encrypted by the individual signature value as a parameterised key (KPi). Decryption of the parameterised key (KPi) using the individual signature key yields the digest (KRi). As before, the locally built ECM key is used to decrypt the double encrypted control word (CW") and the resulting encrypted control word (CW') is decrypted using either the digest (KRi) or the global EMM key (GEMMK). In this embodiment, the individual signature value (ISVi) can therefore be changed at any time as and when the content provider deems it necessary, thus adding a level of security.

It should be noted that the above embodiment may be combined with another embodiment as described herein in that the control word could be encrypted directly by the digest (KRi), in which case the digest (KRi) would be used to decrypt the encrypted control word (CW').

According to an alternative embodiment of the present invention, instead of building the signature value (SVi) via a specific set of operations during EMM processing (OPEMM) or the check value (CV) via a specific set of operations during ECM processing (OPECM), either the signature value (SVi) or the check value (CV) or both these values could be read from some pre-determined register such as a software environment variable or a chip configuration variable for example or it could be derived from a known parameter such as a file or record header or a stack depth. Another possibility would be to write a value to a memory and later retrieve that value to be used in the calculation of the signature value or check value. This way if there is an attempt to perform a spike attack or a flash attack, then the value written to RAM may also suffer a perturbation during the attack thus corrupting the signature value or check key.

The invention claimed is:

1. A method for allowing a receiving device, comprising a security module, to access media services encrypted under at least a control word, said access being subject to at least the presence of a right in said security module, the method comprising:
   recording, with a processor of the security module, the right in the security module by:
      receiving an entitlement management message comprising at least said right and verification data;
      processing the entitlement management message at least to check the verification data;
      during the processing of said entitlement management message, building a signature value through a plurality of predetermined operations at intervals within said processing;
      deriving a digest from at least a part of said signature value; and
      in response to said entitlement management message being valid, recording the right into a rights database together with the digest; and
   determining, with the processor, the control word by:
      receiving an entitlement control message comprising an encrypted control word and an access condition referring to said right;
      processing said entitlement control message at least to verify whether the right referred to by said access condition is present in the rights database;
      retrieving the digest corresponding to the right referred to by the access condition when the right referred to by said access condition is present in the rights database; and
      decrypting the encrypted control word using said digest.

2. The method according to claim 1, wherein the control word is encrypted by a global EMM key, said method further comprising:
   pre-storing in the security module at least one cryptogram related to said right, said cryptogram representing the global EMM key encrypted by the digest;
   during the processing of the entitlement control message, retrieving the cryptogram related to the selected right;
   decrypting the retrieved cryptogram with the digest to obtain the global EMM key; and
   using the global EMM key to decrypt the encrypted control word to obtain the control word.

3. The method according to claim 2, wherein said right refers to one of a plurality of different possible categories of rights, the control word being encrypted by said global EMM key, said method further comprising:
   pre-storing in the security module a plurality of cryptograms each being related to one of said categories, each cryptogram representing the global EMM key encrypted by the digest pertaining to said category;
   during the processing of the entitlement control message, determining the category referred to by said access condition and retrieving the cryptogram corresponding to the category thus determined; and
   decrypting the retrieved cryptogram with the digest corresponding to said category to obtain the global EMM key.

4. The method according to claim 2, wherein the control word is double encrypted by the global EMM key and a global ECM key, said method further comprising:
   during the processing of said entitlement control message, locally building an ECM key equivalent to the global ECM key through a plurality of predetermined operations at intervals within said processing step; and
   decrypting the double encrypted control word using the resulting ECM key to obtain the encrypted control word.

5. The method according to claim 4, wherein the entitlement management message further comprises a parameterized key and wherein at least one parameter can be derived from said electronic management message, said method further comprising:
   while determining the digest, using the at least one parameter from the entitlement management message to calculate an individual signature value related to said entitlement management message;
   extracting the parameterized key from the entitlement management message; and
   decrypting the parameterized key with the calculated individual signature value to obtain the digest.

6. A receiving device comprising a security module to access media services encrypted under at least a control word, said access being subject to at least the presence of a right in said security module, said security module comprising:
   a processor; and
   a database connected to the processor;
   wherein the processor is configured to record the right in the security module by:
      receiving an entitlement management message comprising at least said right and verification data;
      processing the entitlement management message at least to check the verification data;
      during the processing of said entitlement management message, building a signature value through a plurality of predetermined operations at intervals within said processing;
      deriving a digest from at least a part of said signature value; and
      in response to said entitlement management message being valid, recording the right into a rights database together with the digest; and
   wherein the processor is configured to determine the control word by:
      receiving an entitlement control message comprising an encrypted control word and an access condition referring to said right;
      processing said entitlement control message at least to verify whether the right referred to by said access condition is present in the rights database;
      retrieving the digest corresponding to the right referred to by the access condition when the right referred to by said access condition is present in the rights database; and
      decrypting the encrypted control word using said digest.

7. The receiving device according to claim 6, wherein the control word is encrypted by a global EEM key, and wherein the processor is further configured to pre-store in the security module at least one cryptogram related to said right, said cryptogram representing the global EMM key encrypted by the digest;

during the processing of the entitlement control message, retrieve the cryptogram related to the selected right;

decrypt the retrieved cryptogram with the digest to obtain the global EMM key; and use the global EMM key to decrypt the encrypted control word to obtain the control word.

8. The receiving device according to claim 6, wherein said right refers to one of a plurality of different possible categories of rights, the control word being encrypted by said global EMM key, and wherein the processor is further configured to:

pre-store in the security module a plurality of cryptograms each being related to one of said categories, each cryptogram representing the global EMM key encrypted by the digest pertaining to said category;

during the processing of the entitlement control message, determine the category referred to by said access condition and retrieving the cryptogram corresponding to the category thus determined; and decrypt the retrieved cryptogram with the digest corresponding to said category to obtain the global EMM key.

9. The receiving device according to claim 6, wherein the control word is double encrypted by the global EMM key and a global ECM key, and wherein the processor is further configured to:

during the processing of said entitlement control message, locally build an ECM key equivalent to the global ECM key through a plurality of predetermined operations at intervals within said processing step; and decrypting the double encrypted control word using the resulting ECM key to obtain the encrypted control word.

10. The receiving device according to claim 9, wherein the entitlement management message further comprises a parameterized key, wherein at least one parameter can be derived from said electronic management message, and wherein the processor is further configured to:

while determining the digest, use the at least one parameter from the entitlement management message to calculate an individual signature value related to said entitlement management message;

extract the parameterized key from the entitlement management message; and decrypt the parameterized key with the calculated individual signature value to obtain the digest.

* * * * *